US011309095B2

(12) United States Patent
Barger et al.

(10) Patent No.: US 11,309,095 B2
(45) Date of Patent: Apr. 19, 2022

(54) CONTROL ROD DRIVE MECHANISM WITH SEPARATE LATCH AND DRIVE COILS

(71) Applicant: BWXT Advanced Technologies LLC, Lynchburg, VA (US)

(72) Inventors: Earl Brian Barger, Goode, VA (US); Scott Lee Fitzner, Appomattox, VA (US); Roger Dale Ridgeway, Rustburg, VA (US); Scott James Shargots, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 16/831,201

(22) Filed: Mar. 26, 2020

(65) Prior Publication Data

US 2020/0357530 A1    Nov. 12, 2020

Related U.S. Application Data

(60) Provisional application No. 62/825,506, filed on Mar. 28, 2019.

(51) Int. Cl.
*G21C 7/12*     (2006.01)
*G21C 7/14*     (2006.01)
*G21C 9/02*     (2006.01)

(52) U.S. Cl.
CPC .................. *G21C 7/14* (2013.01); *G21C 7/12* (2013.01); *G21C 9/02* (2013.01)

(58) Field of Classification Search
CPC ... G21C 7/08; G21C 7/12; G21C 7/14; G21C 19/10; G21C 19/105; G21C 19/115; F16H 25/00; F16H 25/2025
(Continued)

(56) References Cited

U.S. PATENT DOCUMENTS

| 2,780,740 A | * | 2/1957 | Robinson | F16H 25/2025 |
| | | | | 310/67 R |
| 2,803,761 A | * | 8/1957 | Young | H02K 41/03 |
| | | | | 310/14 |

(Continued)

FOREIGN PATENT DOCUMENTS

| GB | 927522 A | * | 5/1963 | ............. G21C 19/10 |
| WO | 2021002899 A2 | | 1/2021 | |

OTHER PUBLICATIONS

Clark, B. et al., "Use of a closed system drug-transfer device eliminates surface contamination with antineoplastic agents," J Oncol Pharm Practice, 6 pages (2013).
(Continued)

*Primary Examiner* — Jack W Keith
*Assistant Examiner* — Jinney Kil
(74) *Attorney, Agent, or Firm* — Nelson Mullins Riley & Scarborough LLP (57) ABSTRACT

A control rod drive mechanism for use in a nuclear reactor including a reactor core disposed in a pressure vessel, including a control rod configured for insertion into the reactor core, a lead screw, the control rod being secured to the bottom end of the lead screw, a drive mechanism including a torque tube having a top end and a bottom end, a pair of segment arms that are pivotably mounted to the torque tube, a pair of roller nuts, each roller nut being rotatably secured to the bottom end of a respective segment arm, and a drive motor including a stator and a rotor secured to the top end of the torque tube that includes a plurality of permanent magnets embedded therein, wherein the stator defines a central bore in which the rotor is disposed, and a latch coil assembly including a latch coil, wherein the latch coil assembly defines a central bore in which the top ends of (Continued)

the segment arms are disposed radially-inwardly of the latch coil.

7 Claims, 6 Drawing Sheets

(58) Field of Classification Search
USPC .................................. 376/219, 228, 233, 235
See application file for complete search history.

(56) References Cited

U.S. PATENT DOCUMENTS

| | | | |
|---|---|---|---|
| 2,857,537 A | 10/1958 | Roman et al. | |
| 3,132,290 A * | 5/1964 | Kumpf | H01F 7/08 |
| | | | 361/144 |
| 3,299,302 A * | 1/1967 | Frisch | H02K 7/065 |
| | | | 310/12.32 |
| 3,445,689 A * | 5/1969 | Sherwood | G21C 7/12 |
| | | | 310/14 |
| 3,822,439 A * | 7/1974 | Wallin | F16H 25/2266 |
| | | | 74/424.91 |
| 4,484,093 A | 11/1984 | Smith | |
| 5,233,248 A | 8/1993 | Kawamura et al. | |
| 5,793,826 A * | 8/1998 | Sato | G21C 7/12 |
| | | | 376/228 |
| 2012/0187308 A1 | 7/2012 | Evers | |
| 2013/0335181 A1* | 12/2013 | Choi | H01F 27/022 |
| | | | 336/96 |
| 2014/0334586 A1 | 11/2014 | DeSantis et al. | |
| 2020/0357530 A1 | 11/2020 | Barger et al. | |

OTHER PUBLICATIONS

International Search Report and Written Opinion, PCT/US2020/24938, dated Feb. 3, 2021, 12 pages.

Ishida, T. et al., "Development of In-vessel Type Conlrol Rod Drive Mechanism for Marine Reactor," Journal of Nuclear Science and Technology, vol. 38(7):557-570, DOI: 10.1080/18811248.2001.9715067.

Leece, A. et al., "A container closure system that allows for greater recovery of radiolabeled peptide compared to the standard borosilicate glass system," Applied Radiation and Isotopes, vol. 80:99-102 (2013).

* cited by examiner

CONTROL ROD DRIVE MECHANISM WITH SEPARATE LATCH AND DRIVE COILS

CLAIM OF PRIORITY

This application claims priority to U.S. Provisional Application No. 62/825,506, filed Mar. 28, 2019, the entire disclosure of which is incorporated by reference herein.

TECHNICAL FIELD

The presently-disclosed invention relates generally to systems for raising and lowering control rods in nuclear reactors and, more specifically, to control rod drive mechanisms that include drive motors that function independently of the latch coils.

BACKGROUND

As is known in the art, various types of nuclear reactors utilize control rods to regulate reactivity levels and, therefore, the operation of the reactors by raising and lowering the control rods within the respective reactor cores, as required by power demands. Control rod drive mechanisms are used to raise and lower the control rods. An example control rod drive mechanism may include a pair of segment arms that are pivotably attached to a corresponding torque tube so that the upper ends of the segment arms are disposed within a central bore of a stator of a control rod drive motor, and the lower ends of the segment arms each include a roller nut for selectively engaging a threaded lead screw from which one or more control rods are suspended. During power operations, energizing the stator causes the upper ends of the segment arms to pivot radially-outwardly due to an induced magnetic field in the stator so that the bottom ends of the segment arms pivot radially-inwardly, causing the roller nuts to engage, or latch, the lead screw. Subsequent rotation of the segment arms is achieved by stepping the drive motor, i.e., changing the phase or the motor's stator. Whether the control rods are raised or lowered is dependent upon the direction of rotation of the induced magnetic field, as determined by the stator. The control rods can be rapidly dropped, or scrammed, into the reactor core in order to shut down the reactor core. This is achieved by securing power to the stator, thereby preventing the stator from producing the induced magnet field.

Figure 6:
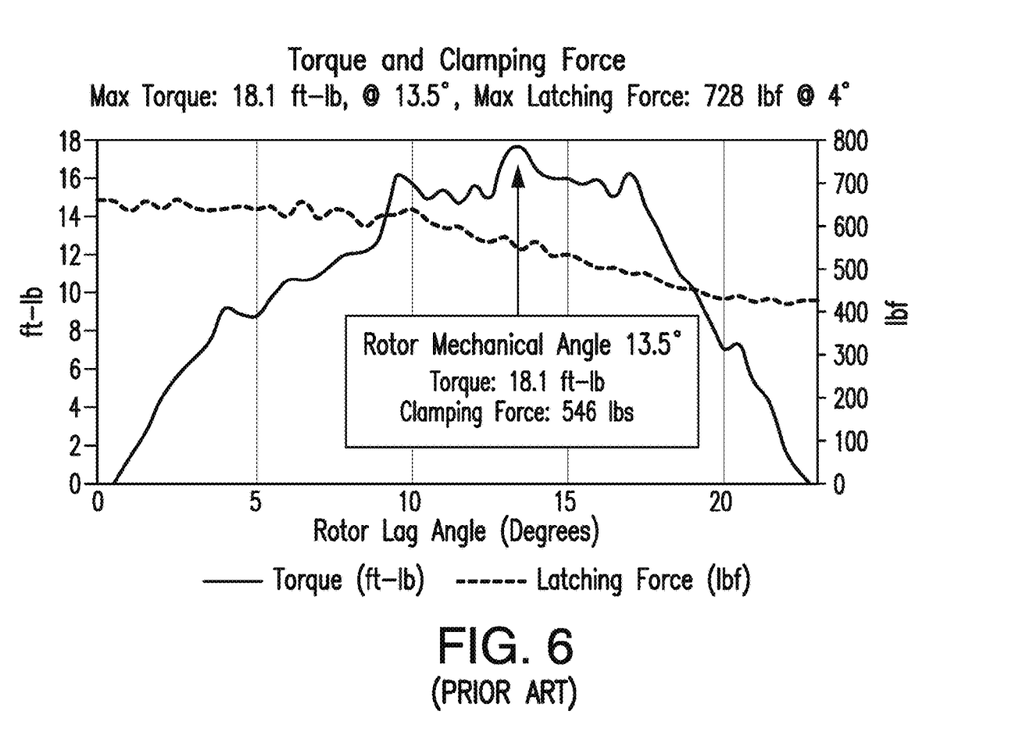
FIG. 6 is a graph showing the drive torque and clamping force of a prior art control rod drive mechanism with respect to the rotor lag angle/torque angle.

Although the above described control rod drive mechanisms have been found to operate reliably for extended periods of time, there are various disadvantages that may exist. Specifically, typical control rod drive motors include a single stator coil that performs latch, hold, and drive operations. As such, the single stator coil, which has a single power source, provides both the induced rotating magnetic field for rotating the segment arms, as well as the roller nut clamping force which pulls the upper portions of the segment arms radially-outwardly so that the roller nuts engage the lead screw during latch and hold operations. As such, the motor's drive torque and roller nut clamping force are dependent variables, as shown in FIG. 6. As shown, peak rotational torque may not occur at the same rotor lag angle as the peak roller nut clamping torque, which means the roller nuts may partially open at peak motor torque if the clamping force is not adequate.

Figure 7:
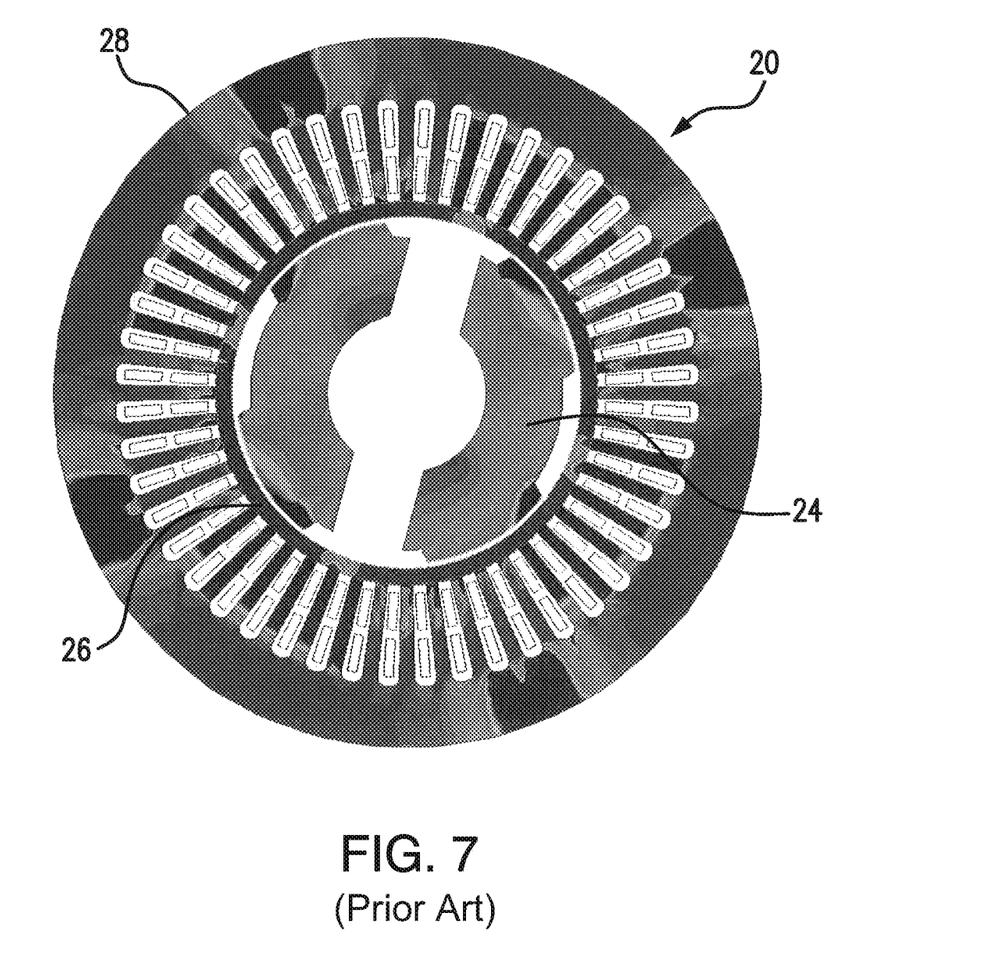
FIG. 7 is a cross-sectional view of a prior art control rod drive mechanism showing the magnetic field intensity of the drive motor.

Additionally, referring now to FIG. 7, in known control rod drive motors 20 the pressure boundary tube 26 located between the segment arms 24 and the stator 28 decreases the motor's efficiency due to leakage flux. The reduced efficiency requires higher current to the stator, resulting in increased temperatures within the stator's core and increased copper losses due to increased resistance. The increased temperatures and high copper losses create significant issues with regard to operating in high temperature environments when not providing external cooling for known control rod drive motors having a single stator with a single power source.

There at least remains a need, therefore, for a system for controlling drive rods in a nuclear reactor that allows maximization of the drive torque independently of the latching force.

SUMMARY OF THE INVENTION

One embodiment of the present disclosure provides a control rod drive mechanism for use in a nuclear reactor including a reactor core disposed in a pressure vessel, including a control rod configured for insertion into the reactor core, a lead screw having a top end and a bottom end, the control rod being secured to the bottom end of the lead screw, a drive mechanism including a torque tube having a top end and a bottom end, a pair of segment arms, each segment arm including a top end and a bottom end and being pivotably mounted to the torque tube, a pair of roller nuts, each roller nut being rotatably secured to the bottom end of a respective segment arm, and a drive motor including a stator and a rotor secured to the top end of the torque tube that includes a plurality of permanent magnets embedded therein, wherein the stator defines a central bore and the rotor is disposed within the central bore of the stator, and a latch coil assembly including a latch coil, wherein the latch coil assembly defines a central bore and the top ends of the segment arms are disposed within the central bore of the latch coil assembly radially-inwardly of the latch coil.

An alternate embodiment of the present disclosure provides a control rod drive mechanism for use in a nuclear reactor including a reactor core disposed in a pressure vessel, including a control rod configured for insertion into the reactor core, a lead screw having a top end and a bottom end, the control rod being secured to the bottom end of the lead screw, and a drive mechanism including a torque tube having a top end and a bottom end, a pair of segment arms, each segment arm including a top end and a bottom end and being pivotably mounted to the torque tube, a pair of roller nuts, each roller nut being rotatably secured to the bottom end of a respective segment arm, and a drive motor including a stator and a rotor secured to the top end of the torque tube that includes a plurality of permanent magnets embedded therein, wherein the stator defines a central bore and the rotor is disposed within the central bore of the stator.

Yet another embodiment of the present disclosure provides a control rod drive mechanism for use in a nuclear reactor including a reactor core disposed in a pressure vessel, including a control rod configured for insertion into the reactor core, a lead screw having a top end and a bottom end, the control rod being secured to the bottom end of the lead screw, a drive mechanism including a torque tube having a top end and a bottom end, a pair of segment arms, each segment arm including a top end and a bottom end and being pivotably mounted to the torque tube, a pair of roller nuts, each roller nut being rotatably secured to the bottom end of a respective segment arm, and a drive motor including a stator and a rotor that is secured to the top end of the torque tube, wherein the stator defines a central bore and the rotor is disposed within the central bore of the stator, and a latch coil assembly including a latch coil and a hold coil, wherein the latch coil assembly defines a central bore and the top ends of the segment arms are disposed within the central bore of the latch coil assembly radially-inwardly of the latch coil and the hold coil.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Figure 1:
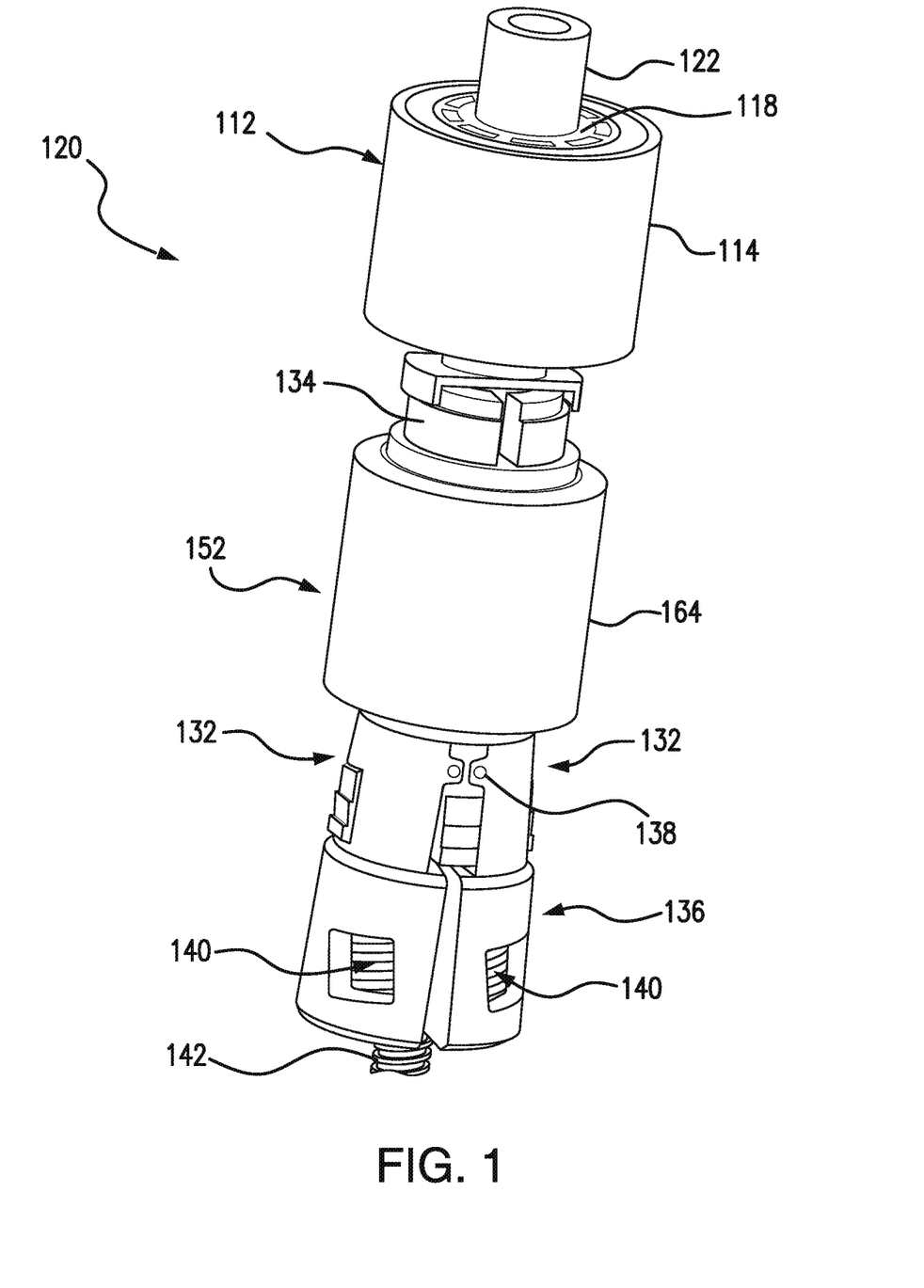
FIG. 1 is a perspective view of a control rod drive mechanism in accordance with an embodiment of the present invention.
Figures 2A, 2B:
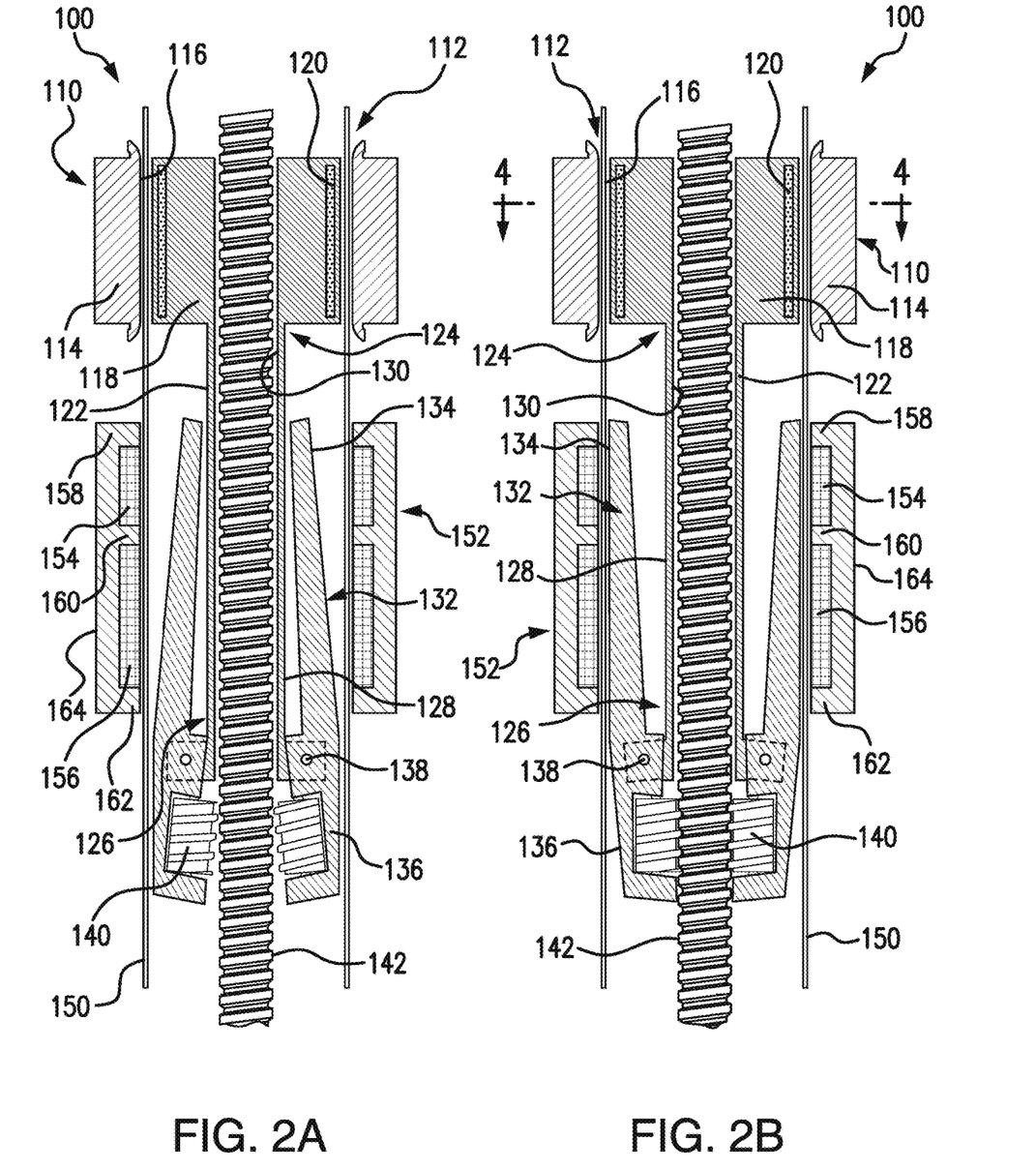
FIGS. 2A and 2B are cross-sectional schematic views of the control rod drive mechanism shown in FIG. 1 in the unlatched and latched positions, respectively.

Referring now to the figures, as shown in FIG. 1, an embodiment of a control rod drive mechanism 100 in accordance with the present invention, a cylindrical torque tube 122, a drive mechanism 110 (FIGS. 2A and 2B) including a pair of segmented arms 132 that are pivotally secured to torque tube 122, a drive motor 112 including a stator 114 and a rotor 118 affixed to torque tube 122, wherein rotor 118 is disposed within a central bore 116 defined by stator 114, and a latch coil assembly 152 disposed radially-outwardly of the top ends of segment arms 132, latch coil assembly 152 including a hold coil 154 and a latch coil 156 disposed within a magnetic sleeve 164. Referring additionally to FIGS. 2A and 2B, each segment arm 132 includes a pair of threaded roller nuts 140 rotatably secured to its bottom end so that roller nuts 140 may be selectively engaged and disengaged from a corresponding lead screw 142 that is received within a bore 130 defined by a body 128 of torque tube 122, as discussed in greater detail below. In alternate embodiments, more than two segment arms 132 may be used and each segment arm 132 may include more than two roller nuts 140. Note, although not shown in FIG. 1, torque tube 122, rotor 118 of driver motor 112, segment arms 132, and roller nuts 140 are disposed within the interior of a pressure tube 140 that forms a portion of the pressure boundary of the corresponding nuclear reactor. The electric components noted above, those being stator 114 of drive motor 112 and latch coil assembly 152, are disposed on the outer surface of pressure tube 150, meaning they are not subject to the internal conditions of the nuclear reactor.

Referring again to FIGS. 2A and 2B, the present embodiment of control rod drive mechanism 100 includes an independent stator for each of the latch, hold and drive operations. Specifically, stator 114 of drive motor 112 is used to create a rotating magnetic field which induces rotor 118 to rotate, thereby causing torque tube 122 to rotate in the desired direction, latch coil 156 is energized during latching operations, thereby urging top ends 134 of segment arms 132 radially-outwardly about their pivot points 138 so that roller nuts 140 are urged radially-inwardly to engage lead screw 142, and hold coil 154 maintains top ends 134 of segment arms in the radially outward position (FIG. 2B) during normal reactor operations. Note, it may be preferable during latching operations to energize both latch coil 156 and hold coil 154 and, upon verifying proper engagement of roller nuts 140 with lead screw 142, securing power to latch coil 156 once normal reactor operations commence. Securing power to latch coil 156 with the exception of during latching operations helps reduce the internal temperatures of the coils, thereby leading to greater efficiency as compared to known control rod drive mechanisms. As shown, hold coil 154 is disposed above latch coil 156, radially-outwardly of the uppermost portions of segment arms 132 in order to maximize the amount of leverage and, therefore, clamping force that hold coil 154 exerts on roller nuts 140 by way of segment arms 132 pivoting about the corresponding pivot points 138. Preferably, hold coil 154 and latch coil 156 include horizontal windings, although they may be wound vertically as well.

Figure 3:
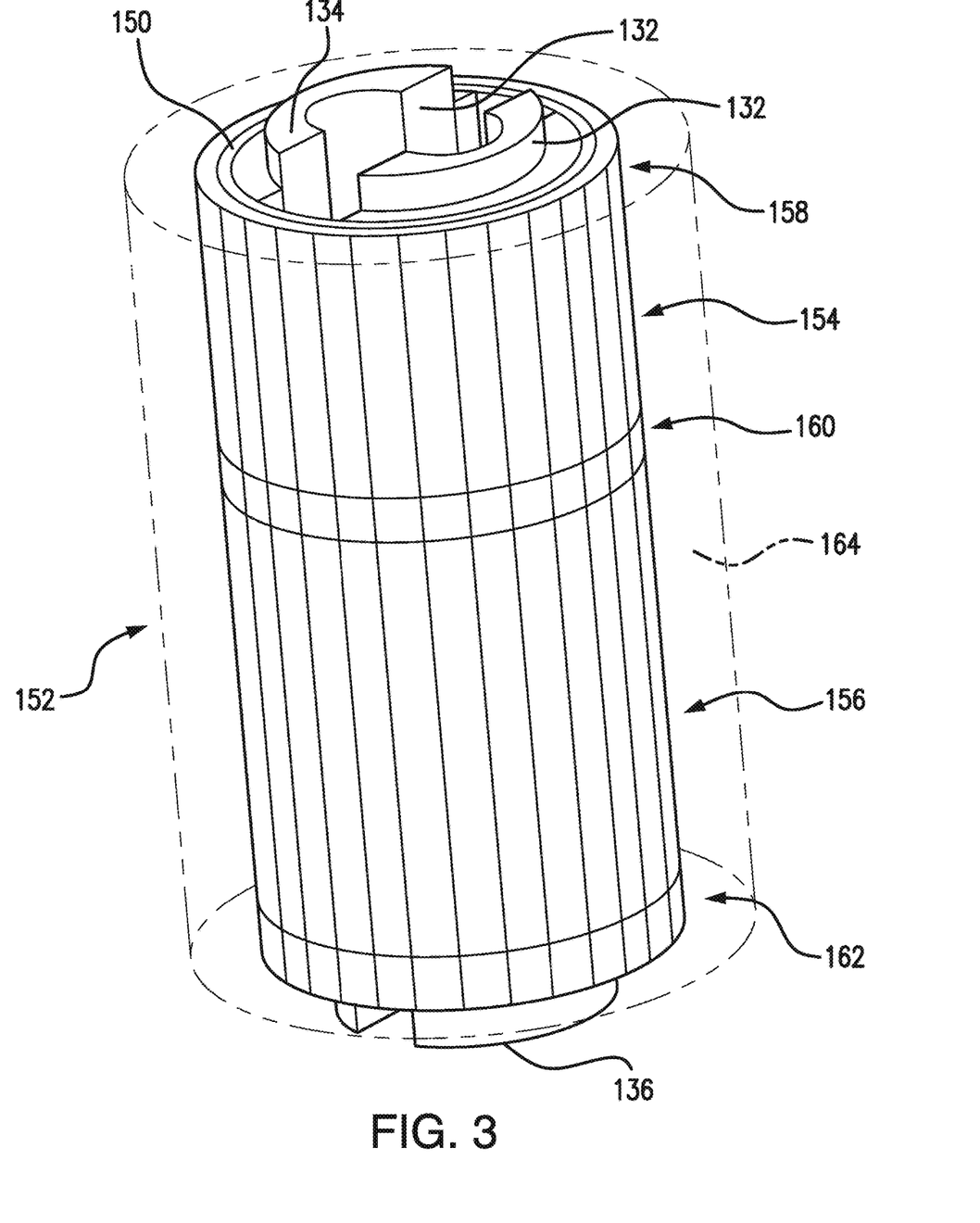
FIG. 3 is a perspective view of the latching and hold coils of the control rod drive mechanism shown in FIG. 1.

Referring now to FIG. 3, hold coil 154 and latch coil 156 are housed within magnetic sleeve 164. As shown, magnetic sleeve 164 includes an upper flux rib 158, a middle flux rib 160 and a lower flux rib 162. Upper flux rib 158 is adjacent to the upper end of hold coil 154, lower flux rib 162 is disposed adjacent the lower end of latch coil 156, and middle flux rib 160 is disposed between the bottom end of hold coil 154 and the upper end of latch coil 156. Flux ribs 158, 160 and 162 facilitate the flow of magnetic flux about hold coil 154 and latch coil 156 without over-saturating since the ribs conduct flux from the outer surface of magnetic sleeve 164 to the top ends 134 of segment arms 132.

Figure 4:
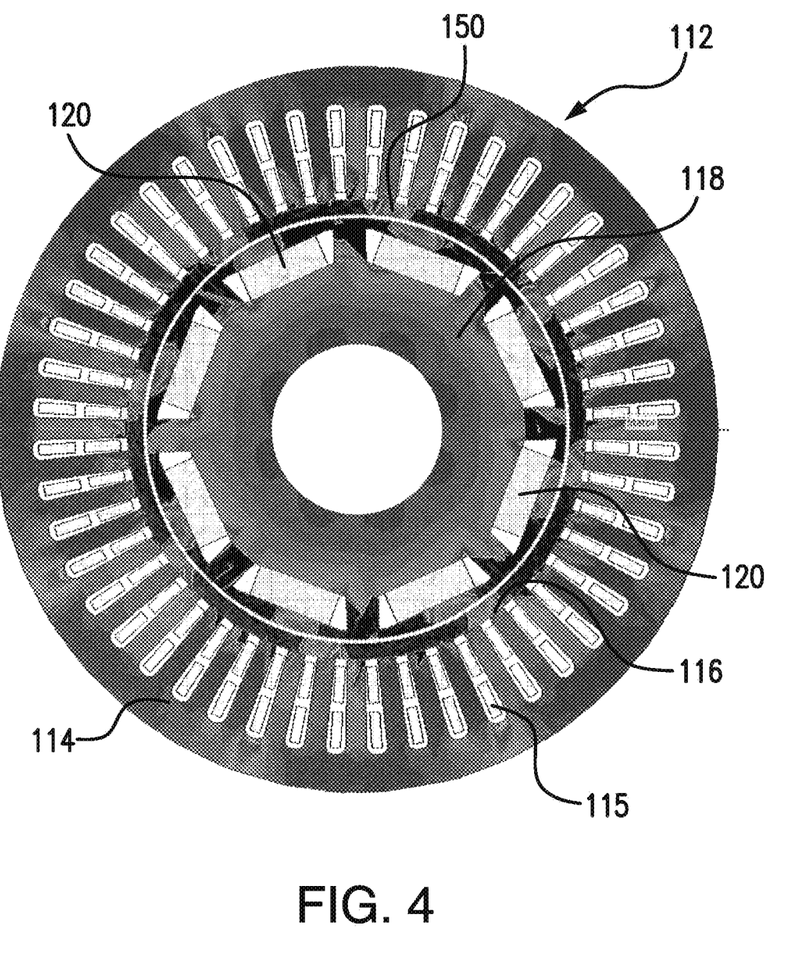
FIG. 4 is a cross-sectional view of the drive motor of the control rod drive mechanism shown in FIG. 2B taken along line 4-4, showing the magnetic field intensity of the drive motor.

Referring now to FIG. 2A, FIG. 2B and FIG. 4, drive motor 112 of control rod mechanism 110 includes a slotted stator 114 that includes vertical windings 115, preferably of ceramic insulated magnetic wire, and rotor 118 that includes a plurality of permanent magnets 120 such as, but not limited to, samarium cobalt ($Sm_2Co_{17}$) magnets 120 embedded therein about is outer perimeter. Magnets 120 on rotor 118 improve the performance of drive motor 112 as compared to existing drive motors (FIG. 7) in that magnets 120 provide a permanent magnetic field on rotor 118, meaning stator 114 does not have to induce a magnetic field in the rotor during drive operations. As such, power requirements for drive motor 112 are reduced as compared to similar drive torque requirements in existing drive motors. Reduced power loads means reduced internal temperatures, few copper losses and, therefore, increased efficiency. As such, the presently discussed embodiment of control rod drive mechanism 100 may either handle similar loads as existing control rod drive mechanisms while operating more efficiently at lower internal operating temperatures of stator 114, or the present embodiment may operate at similar internal operating conditions yet handle higher torque loads due to the greater operating efficiency of drive motor 112. Note, in alternate embodiments, the rotor of the drive motor may be formed by embedding the permanent magnets 120 directly to the top ends of the corresponding segment arms 132. In this type of embodiment, the hold coil 154 functions in the dual role of being the stator of the drive motor.

Figure 5:
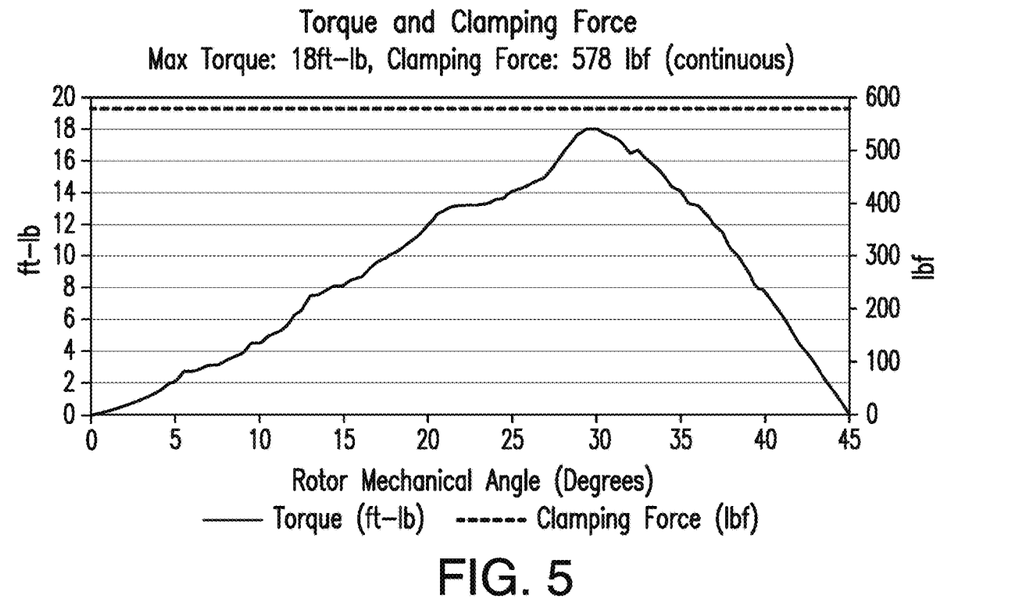
FIG. 5 is a graph showing the drive toque and clamping force of the control rod drive mechanism shown in FIG. 1 with respect to the rotor lag angle/torque angle.

As noted above, control rod drive mechanism 100 utilizes separate coils for each of the latch, hold and drive operations. As such, drive torque of drive motor 112 and roller nut clamping force of latch coil assembly 152 are not dependent upon each other, and the design of each coil can be optimized for its intended function without adversely affecting the operation of the other coils for their intended functions. As shown in FIG. 5, the clamping force of hold coil 154 and/or latch coil 156 is constant and not affected by the rotor angle of drive motor 112. Therefore, the drive motor 112 may be operated at all rotor lag angles without adversely affecting the roller nut clamping force provided by hold coil 154 and/or latch 156. Note also, unlike existing control rod drive mechanisms, the ability to secure power to latch coil 156 during normal reactor operations further increases the efficiency of control drive mechanism 100 as internal temperatures are reduced. Furthermore, the power to the hold coil 154 can be varied to accommodate the drive torque required.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. A control rod drive mechanism for use in a nuclear reactor including a reactor core disposed in a pressure vessel, comprising:
   a control rod configured for insertion into the reactor core;
   a lead screw having a top end and a bottom end, the control rod being secured to the bottom end of the lead screw;
   a drive mechanism including:
      a torque tube having a top end and a bottom end,
      a pair of segment arms, each segment arm including a top end and a bottom end and being pivotably mounted to the torque tube,
      a pair of roller nuts, each roller nut being rotatably secured to the bottom end of a respective segment arm, and
      a drive motor including a stator and a rotor, the rotor secured to the top end of the torque tube and including a plurality of permanent magnets embedded therein, wherein the stator defines a central bore and the rotor is disposed within the central bore of the stator; and
   a latch coil assembly including a latch coil and a hold coil, wherein the latch coil assembly defines a central bore and the top ends of the segment arms are disposed within the central bore of the latch coil assembly radially-inwardly of the latch coil and the hold coil,
   wherein the latch coil and the hold coil are independently energizable and configured so that when the hold coil is energized and the latch coil is de-energized, the roller nuts are engaged with the lead screw.

2. The control rod drive assembly of claim 1, wherein the hold coil is disposed above the latch coil in the latch coil assembly.

3. The control rod drive assembly of claim 1, further comprising a pressure tube that defines a portion of a pressure boundary of the pressure vessel, wherein the stator of the drive motor and the latch coil assembly are disposed outside of the pressure tube.

4. The control rod drive assembly of claim 3, wherein the torque tube, the rotor of the drive motor, the segment arms and the roller nuts are disposed inside an interior of the pressure tube.

5. The control rod drive assembly of claim 1, wherein the plurality of the permanent magnets are disposed evenly about a perimeter of the rotor of the drive motor.

6. The control rod drive assembly of claim 5, wherein the plurality of permanent magnets further comprise a plurality of $Sm_2Co_{17}$ magnets.

7. The control rod drive assembly of claim 1, wherein the latch coil is a circumferentially wound coil.

* * * * *